Figure 6:
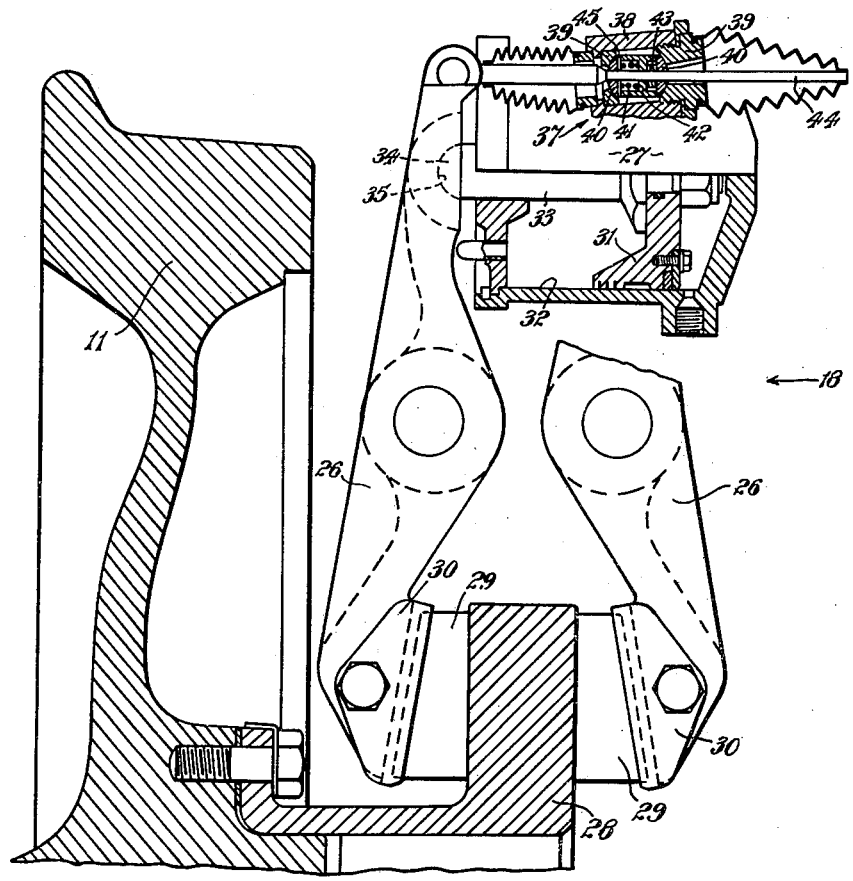

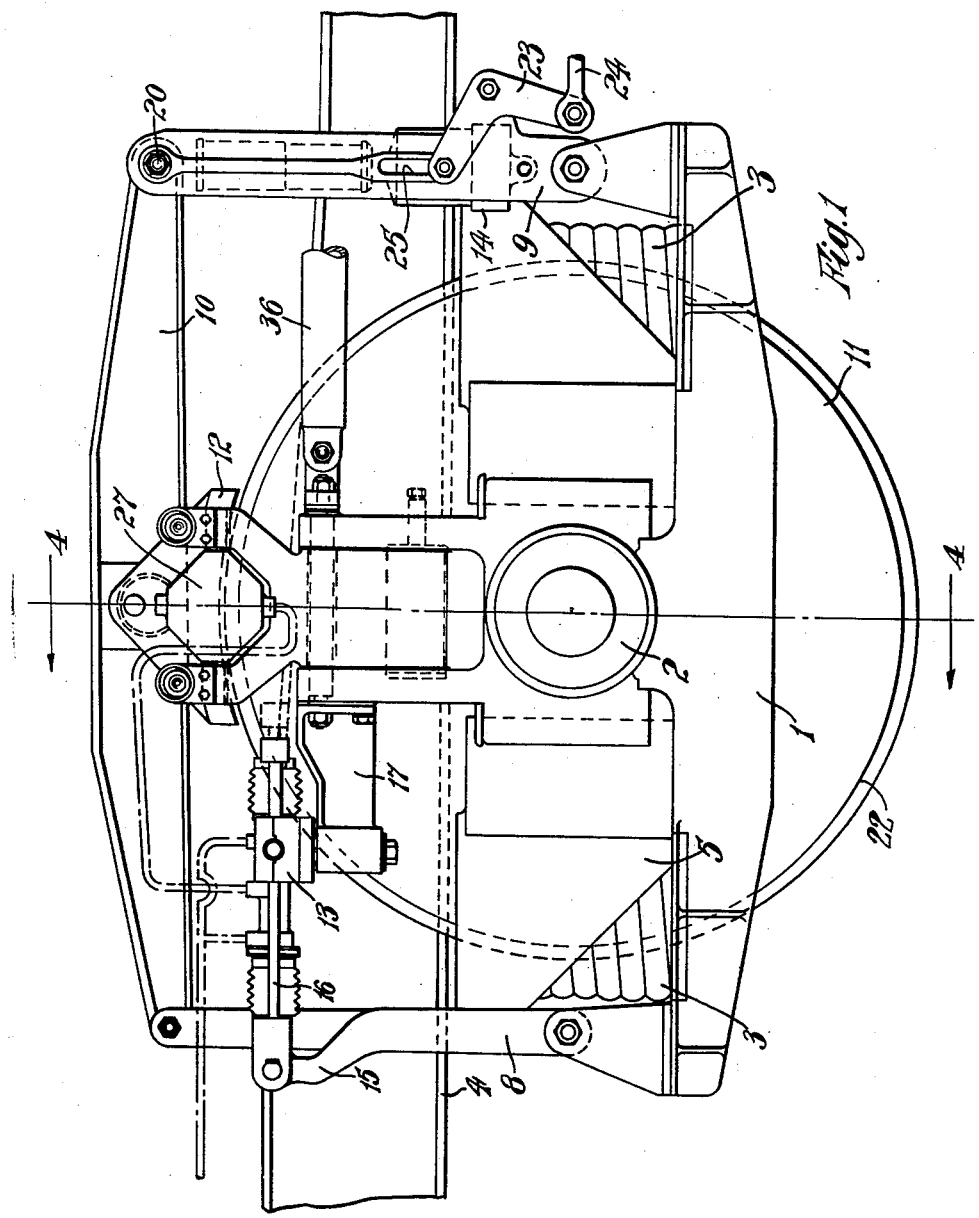

Nov. 6, 1962    H. J. BUTLER    3,062,328
RAILWAY WHEEL, BRAKE AND SUSPENSION ASSEMBLIES
Filed Sept. 15, 1959    5 Sheets-Sheet 2
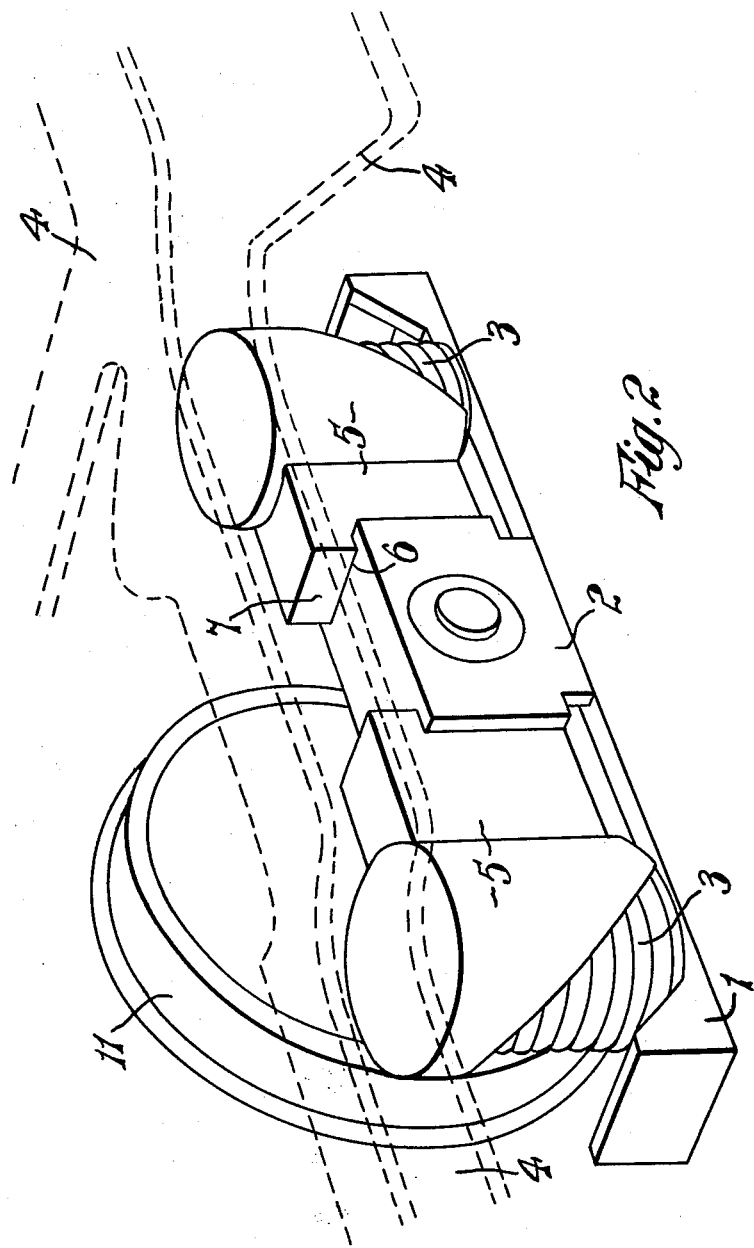

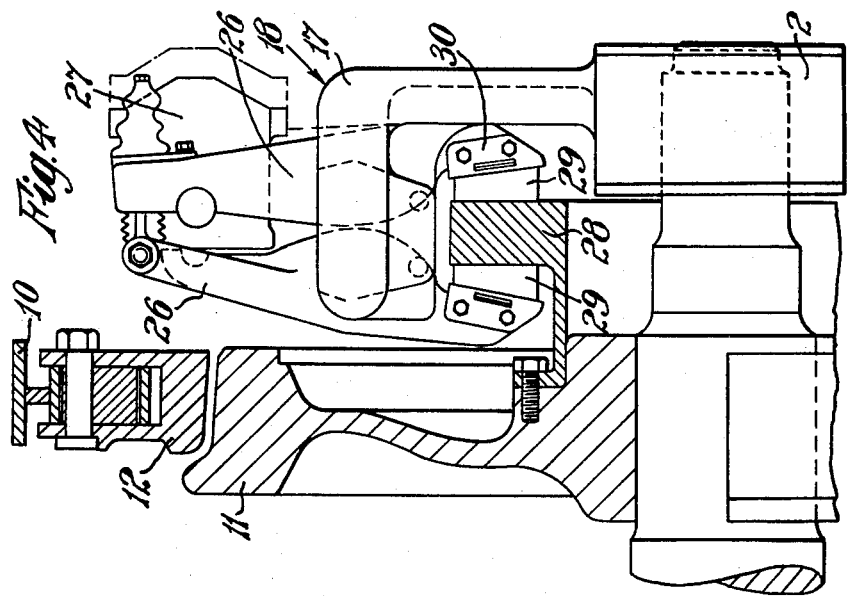
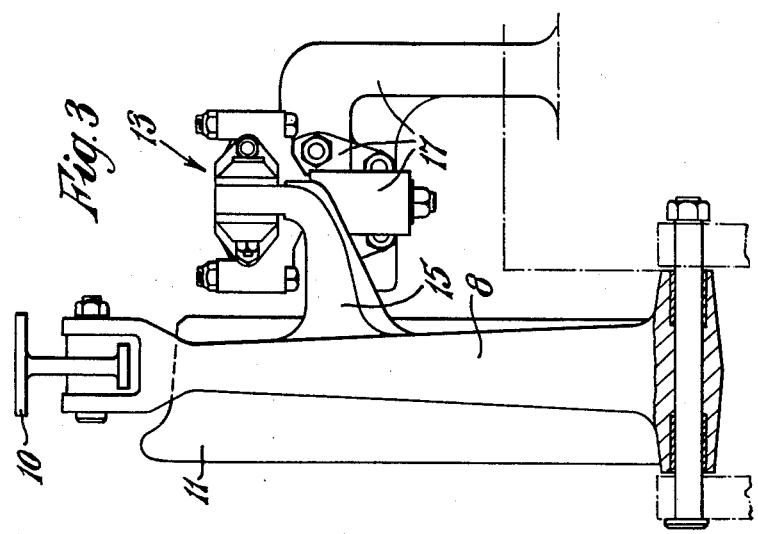

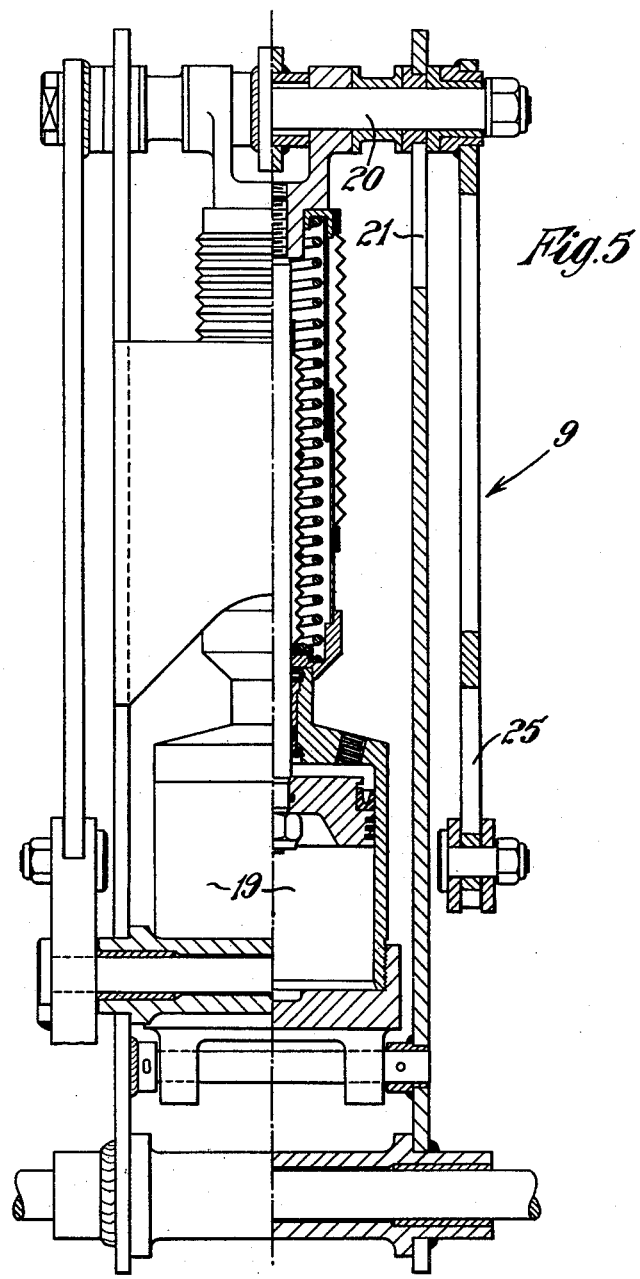

Nov. 6, 1962   H. J. BUTLER   3,062,328
RAILWAY WHEEL, BRAKE AND SUSPENSION ASSEMBLIES
Filed Sept. 15, 1959   5 Sheets-Sheet 5

INVENTOR
Henry James Butler
by Benj. T. Rauber
his attorney

United States Patent Office 3,062,328
Patented Nov. 6, 1962

3,062,328
RAILWAY WHEEL, BRAKE AND SUSPENSION ASSEMBLIES
Henry James Butler, Sutton Coldfield, England, assignor to Dunlop Rubber Company Limited, London, England, a company of Great Britain
Filed Sept. 15, 1959, Ser. No. 840,155
11 Claims. (Cl. 188—33)

This invention relates to railway wheel, brake and suspension assemblies.

In the kind of skid-sensitive railway wheel, brake and suspension assembly described in my co-pending application Serial No. 683,096, filed Sept. 10, 1957, in which the spring comprises a conventional elliptic spring interposed between the axle box and the frame, the geometry of the arrangement does not readily permit the non-rotatable braking members which frictionally engage the railway wheel, or a disc attached thereto, to be secured to an unsprung part of the assembly, with the result that they have to be secured to the sprung wagon frame. This arrangement carries with it the disadvantage that there is relative vertical movement between the friction members of the brake when the sprung frame of the wagon moves up or down on its springs.

The object of the present invention is to provide a compact wheel, brake and suspension assembly wherein this disadvantage is overcome and other advantages are obtained.

According to the present invention a wheel, brake and suspension assembly for a railway vehicle comprises a wheel and axle, an axle box for the axle, a support member secured to said axle box, a resilient compression member interposed between the vehicle frame and the said support member, guides on the said frame engaging with the axle box to prevent relative longitudinal and transverse movement of the frame and axle box, a monitor brake to engage the wheel rim pivotally associated with the said support member and a main brake actuated by angular movement of said monitor brake to engage the wheel or a disc secured thereto and pivotally associated with the axle box.

The preferred embodiment of the invention will now be described with reference to the accompanying drawings of which:

FIGURE 1 is an elevation of the wheel brake and suspension assembly showing certain features, FIGURE 2 is a perspective view of the suspension in simplified form, FIGURE 3 is an end elevation looking from the left of FIGURE 1, FIGURE 4 is a section on the section line 4—4 of FIGURE 1 giving a view of the relationship of brake mechanism to the wheel, FIGURE 5 is a part-sectional view of the pneumatic actuating cylinder, FIGURE 6 is a part-sectional view of the brake actuating mechanism.

The wheel brake and suspension assembly comprises a platform 1, comprising a support member, mounted on the axle box 2 and having spring units 3 interposed between it and the main frame of the vehicle.

Sub-frames 5 are attached to the main frame 4 to accommodate and secure the upper parts of the spring units 3. The axle box 2 is adapted to be guided (see FIGURE 2) by vertical grooves 6 therein which coact with complementary projections from the sub-frames 5. The guides 6 and 7 only allow a relative vertical movement between the two and prevent longitudinal or transverse movement of the axle box 2.

The platform 1 carries the monitor brake, by means of the two substantially vertical members 8 and 9 pivoted at either end thereof and a beam 10, pivotally mounted on the two vertical members 8 and 9 to lie in the plane of the wheel 11, in a substantially horizontal attitude and spaced away from the wheel 11 a short distance above it. The spacing is sufficient to pivotally mount a conventional brake shoe 12 at the center of the beam 10 to enable contact between brake shoe 12 and wheel 11 to be achieved on depression of the beam 10 by an amount corresponding to the required brake clearance.

One vertical member 8 is connected to a hydraulic double acting master cylinder 13 and the other vertical member 9 has a pneumatic actuating cylinder 14 incorporated.

The vertical member 8 illustrated in FIGURE 3 has a branch 15 connected with the piston rod 16 of the master cylinder 13, mounted by a bracket 17 on the axle box 2, so that pivotal movement in either direction of this vertical member 8 about its base will result in a movement of the piston rod 16. Such a movement, irrespective of the direction, will pressurize fluid in the master cylinder 13 and operate the main brake 18. Excessive movement of this vertical member 8 is prevented by suitably positioned stops (not shown) on the frame, while centralizing means are provided within the master cylinder 13.

The vertical member 9 (FIGURE 5), pivoted at its base, is adapted to control the height of the horizontal beam 10. This control is effected by means of a pneumatic jack or ram 19 which pulls the top pivot pin 20 and associated end of the beam 10 downwards during its operation. This movement is allowed by slots 21 in the frame of the member 9. The lowering of this end of the beam 10 will bring the brake shoe 12 into contact with the rim 22 of the wheel 11. Independent mechanical means of actuating this brake are provided by the bell crank 23 and tie-rod 24. The two actuating means are made independent of one another by the lost-motion slots 21 and 25.

The axle box 2 is used as a mounting base (FIGURE 4) for pressure plates 26 and a fluid pressure mechanism 27 which, together with a disc 28 secured to and rotatable with the wheel 11 comprise the main brake 18. The pressure plates 26 (FIGURE 6) are pivoted on the mounting bracket 17 intermediate their ends and are adapted to grip the disc 28 between friction pads 29 secured to a corresponding pair of said ends. The friction pads 29 may be attached to backing plate 30 by bonding or otherwise so forming an assembly which may be easily bolted to the pressure plate ends or the pads of friction material 29 may be secured direct to the pressure plates 26.

The fluid pressure mechanism 27 previously referred to is pivotally mounted on the pressure plates 26 between the pair of ends remote from the friction pads 29. The fluid pressure mechanism 27 comprises a piston 31 and cylinder 32, with the cylinder 32 pivotally mounted on one pressure plate 26 and the piston rod 33, rigidly secured to the piston 31 at one end and having a hemispherical end 34 at the other bearing in a complementary recess 35 in the other pressure plate 26.

The main brake 18 is also provided with a wear compensation device 37 which ensures a constant clearance between the friction pad and the braking surface of the disc 28 irrespective of the wear that has taken place on the pads 29.

The wear compensation device 37 comprises a housing 38 pivotally secured to one of said pressure plate 26 at the pressure cylinder end, having a bore therethrough, a pair of ball joint seats 39 within said bore, a pair of members 40 spring urged to seat on said ball joint seats 39, between the members 40 a spring 41 urging them apart, a distance spacer guide 42, and a friction element 43 adapted to grip a pin 44 which threads all the aforementioned members of the wear compensation device and is pivotally secured to the opposite pressure plate 26. The pressure plates 26 are allowed a certain degree of movement, governed by the clearance 45 between the member 40 and the distance piece 42, without relative movement of friction element 43 and pin 44. If the brake is not fully applied when this clearance 45 has been taken up, the friction grip of the element 43 on the pin 44 is overcome and the pin 44 moves relative to the element 43. Subsequent release of the brake allows the pressure plates 26 to return by an amount corresponding to the clearance 45 and thus a constant pad clearance is provided during the life of the pad 29 and irrespective of the degree of wear.

The operation of the brake is as follows:

The pneumatic cylinder 19 is actuated by the driver or controller thus moving the horizontal beam 10 downwards and the brake shoe 12 attached thereto into engagement with the rim 22 of the rotating wheel 11. The drag of the brake shoe 12 acts in a direction tangential to the wheel 11 and pivots the vertical member 8 about one end of the platform 1. This movement actuates the master cylinder 13 connected to the vertical member 8 by the branch 15 and so pressurizes the brake mechanism 27 to force the associated ends of the pressure plates 26 outwards, and the friction pads 29 into gripping engagement with the rotating disc 28 thus braking the vehicle.

The brakes are released by releasing the pressure in in the pneumatic cylinder 19 and thus lessening in turn the tangential force on the monitor brake, the pressure of fluid in the master cylinder 13 and brake mechanism 27 and the braking of the vehicle by the main brake 18.

The advantage derived from the invention is that since the brake system and wheel move as one the clearance between the monitor brake shoe and wheel rim remain the same whether the vehicle is in a loaded or unloaded state. This leads to a more predictable and reliable braking performance under all conditions.

Having now described my invention, what I claim is:

1. A wheel brake and suspension assembly for vehicles which comprises an axle box for mounting on the axle of the vehicle, means for preventing rotation of said axle box about the axis of said axle, a main brake mounted solely on said axle box, a monitor brake controlling the application of said main brake, means supporting said monitor brake from said axle box to engage the rim of a wheel of said vehicle rotating with said axle and to move a limited distance with the rim and means actuated by the movement of said monitor brake to actuate said main brake.

2. The wheel brake and suspension assembly of claim 1 in which said main brake comprises a disc mounted to rotate with said axle, at least one brake shoe movable into frictional engagement with said disc, fluid operated means to move said brake shoe into engagement with said disc, and means actuated by said monitor brake to supply fluid under pressure to said main brake.

3. The wheel brake and suspension assembly of claim 1 in which said means for preventing rotation of said axle box comprises a pair of guide elements one carried by said axle box and the other movable vertically with the vehicle and slidable vertically relatively to the other.

4. The wheel brake and suspension assembly of claim 1 in which said means for supporting said monitor brake from said axle box comprises a pair of vertically extending members pivoted at their lower ends on said axle box and a beam pivotally connected to the upper ends of said vertically extending members and carrying the monitor brake.

5. The wheel brake and suspension assembly of claim 4 in which said beam is slidable vertically on at least one of said vertically extending members, said assembly comprising means to force said beam downwardly on said vertically extending member.

6. A wheel brake and suspension assembly for a railway vehicle comprising a wheel and axle, an axle box for the axle, a support member secured to the axle box, a resilient compression member interposed between the vehicle frame and the support member, guides between said frame and said axle box to guide said axle box in vertical movement relative to said frame and to hold said axle box from other movement relative to said frame, a monitor brake mounted on said axle box and movable to engage the rim of said wheel and movable by said rim on engagement therewith, a main brake mounted on said axle box, and means mounted solely on said axle box and actuated by said movement of said monitor brake to apply said main brake.

7. An assembly for a railway vehicle according to claim 6 comprising fluid means actuated by said monitor brake to actuate said main brake.

8. An assembly for a railway vehicle according to claim 6 wherein said main brake is fluid actuated and in which said assembly comprises a hydraulic double acting master cylinder actuated by said monitor brake to supply fluid under pressure to said main brake.

9. An assembly for a railway vehicle according to claim 6 wherein said monitor brake comprises a brake shoe pivotally mounted on said axle box and said support member and frictionally engageable with said wheel rim.

10. An assembly for a railway vehicle according to claim 6 wherein said main brake is mounted on an unsprung part of said vehicle and comprises a disc rotatable with said wheel and axle and with which are frictionally engageable pairs of non-rotatable pads of friction material.

11. An assembly for a railway vehicle according to claim 6 wherein said monitor brake is operated by fluid means under the control of an operator.

References Cited in the file of this patent

UNITED STATES PATENTS

| Re. 22,558 | Mystrom et al. | Oct. 24, 1944 |
|---|---|---|
| 2,177,954 | Stewart | Oct. 31, 1939 |
| 2,246,213 | Logan | June 17, 1941 |
| 2,320,086 | Ledwinka | May 25, 1943 |
| 2,536,269 | Driscoll | Jan. 2, 1951 |
| 2,614,508 | Archambault | Oct. 21, 1952 |
| 2,685,847 | Waldvogel | Aug. 10, 1954 |
| 2,751,046 | Tack | June 19, 1956 |
| 2,855,073 | Walker | Oct. 7, 1958 |
| 2,873,821 | Mann et al. | Feb. 17, 1959 |
| 2,874,646 | Holin | Feb. 24, 1959 |
| 2,875,705 | Wolf et al. | Mar. 3, 1959 |
| 2,940,544 | Butler | June 14, 1960 |
| 2,989,152 | Butler | June 20, 1961 |